United States Patent [19]

Singh et al.

[11] Patent Number: 5,300,561
[45] Date of Patent: Apr. 5, 1994

[54] SOLUTION CONTAINING AMPHIPHILIC MOLECULES

[75] Inventors: Brij P. Singh, North Royalton; Raj Subramaniam, Parma; Scott E. Rickert, Lakewood, all of Ohio

[73] Assignee: NanoFilm Corporation, Valley View, Ohio

[21] Appl. No.: 924,921

[22] Filed: Aug. 5, 1992

Related U.S. Application Data

[62] Division of Ser. No. 774,456, Oct. 10, 1991, Pat. No. 5,166,000.

[51] Int. Cl.[5] ............................................. C08K 5/05
[52] U.S. Cl. ................................. 524/765; 524/858; 524/837
[58] Field of Search .................... 524/858, 837, 765

[56] References Cited

U.S. PATENT DOCUMENTS

| | | | |
|---|---|---|---|
| 4,929,662 | 5/1990 | Hogenmuller et al. | 524/376 |
| 4,952,622 | 8/1990 | Chauvel et al. | 524/376 |
| 5,106,561 | 4/1992 | Singh et al. | 264/165 |
| 5,109,038 | 4/1992 | Chauvel et al. | 524/217 |
| 5,166,307 | 11/1992 | Cherdron et al. | 528/183 |

Primary Examiner—Melvyn I. Marquis
Assistant Examiner—Karen A. Dean
Attorney, Agent, or Firm—Jones, Day, Reavis & Pogue

[57] ABSTRACT

A solution of amphiphilic molecules and water is atomized to form a mist of droplets which are deposited on a substrate surface to completely cover same with a coating of the solution. The amphiphilic molecules in the coating self-assemble on the surface into a continuous thin film that is less than 500 nanometers thick. The water is evaporated from the coating to leave only the film chemically bonded to the surface.

7 Claims, 3 Drawing Sheets

SOLUTION CONTAINING AMPHIPHILIC MOLECULES

This is a division of application Ser. No. 07/774,456 filed Oct. 10, 1991, now U.S. Pat. No. 5,166,000 issued Nov. 24, 1992.

BACKGROUND OF THE INVENTION

This application relates to the art of ultra-thin films and to procedures for applying same to substrate surfaces. More particularly, the application concerns thin films formed of amphiphilic molecules. The invention is particularly applicable for use with cookware and will be described with specific reference thereto. However, it will be appreciated that the invention has broader aspects and can be used in connection with any substrate surface, particularly surfaces of glass, ceramic and porcelain.

Burnt and dried food residues are very difficult to remove from cookware surfaces, and many different types of non-stick coatings have been applied to such surfaces. These coatings tend to be applied subsequent to manufacture of the cookware, rather than as an integral part of the same manufacturing process. The coatings also tend to require pretreatment of the cookware surfaces, such as by etching, grit blasting or application of base coats. Processes for applying the coatings often have high energy requirements, and sometimes use or produce undesirable components that are environmentally unsafe and difficult to work with. The common non-stick coatings are relatively thick, such as on the order of millimeters, and ruin the appearance of cookware surfaces when scratched.

Polymerizable amphiphilic molecules having the intrinsic ability to self-assemble in a thin film are well-known. By way of example, descriptions of such materials are contained in: J. Colloid Sci., 1, 531–538 (1946), W. C. Bigelow et al.; J. Colloid & Interface Sci., 27, 751–760 (1968), Lieng-Huange Lee; & J. Sagiv, U.S. Pat. No. 4,539,061, issued Sep. 3, 1985. The disclosures of which are hereby incorporated herein by reference.

Polymerizable amphiphilic molecules of the type described would be ideal for use in providing non-stick coatings on cookware. This is because such molecules form ultra-thin films that are invisible to the naked eye, and do not ruin the appearance of the cookware when scratched. Also, the films have excellent release properties.

However, the use and application of these type of molecules usually requires the use of high amounts of solvents that present environmental concerns and are relatively difficult to work with. The film forming material tends to deteriorate and agglomerate when mixed with water.

It would be desirable to have a procedure for applying thin films of amphiphilic molecules to surfaces in a manner that presents little or no environmental concern and is energy and time efficient.

SUMMARY OF THE INVENTION

Film forming material and deionized water are ultrasonically emulsified and atomized to form a mist of droplets which are deposited on a clean hydrophilic substrate surface to completely cover same with a coating of the emulsion. The amphiphilic molecules in the coating self-assemble on the substrate surface into a continuous thin film that is less than 500 nanometers thick, and more preferably less than about ten nanometers thick. The water is evaporated from the coating to leave only the film chemically bonded to the surface.

In a preferred arrangement, the coating is applied to heated substrate surfaces that are heated to a temperature for evaporating water deposited thereon within about 30–180 seconds. The coating is preferably applied to glass, ceramic or porcelain substrate surfaces as the substrate moves out of an annealing oven during the manufacturing process. The substrate surface is at a temperature between about 100°–200° C. when the mist of droplets is deposited thereon. This process could also be used to coat substrates from warehouse provided the substrate surface is thoroughly cleaned.

When the mist of droplets coats the substrate surface, the amphiphilic molecules align their polar ends with the high energy glass surface. The non-polar ends then face away from the substrate surface. The amphiphilic molecules react with the substrate surface and with one another, and chemically bond to the substrate surface. The molecules form a film that is substantially continuous except for a possible occasional pin hole, and the film has a thickness less than about 500 nanometers, and more preferably less than about ten nanometers.

The amphiphilic molecules used are preferably polymerizable and define the sole film forming ingredient of the composition. Thus, the final film consists essentially of polymerized amphiphilic molecules that are chemically bonded to the substrate surface and to one another.

The film forming mixture deposited on a substrate surface is preferably not less than 90% deionized water. The water may also contain up to about 1% by volume of a mineral acid catalyst to enhance film formation and bonding of same to a substrate surface. Suitable mineral acids include sulfuric, hydrochloric, chromic, phosphoric and nitric acids, with sulfuric and hydrochloric acids being preferred. Concentrated hydrochloric acid catalyst has been used with good results. The catalyst enhances a chemical reaction between hydroxy groups on a glass substrate surface and the amphiphilic molecules.

The film forming material and deionized water are separately delivered to an ultrasonic atomizer where they are mixed together and atomized to form a mist of micron size droplets. The mist is then preferably used to form a coating on a substrate surface within 60 seconds after mist formation.

The film forming molecules are preferably delivered to the ultrasonic atomizer as a solution in alcohol. However, they can be delivered as a pure liquid if so desired, or in other solvents such as alkanes and chlorinated solvents.

It is a principal object of the present invention to provide an improved procedure for forming ultra thin films on substrate surfaces.

It is another object of the invention to provide an improved arrangement for mixing and atomizing amphiphilic molecules with water.

It is also an object of the invention to provide an improved coating material in the form of a mist of droplets, with each droplet containing some film forming amphiphilic molecules while being at least 90% water.

DESCRIPTION OF A PREFERRED EMBODIMENT

Figure 1:
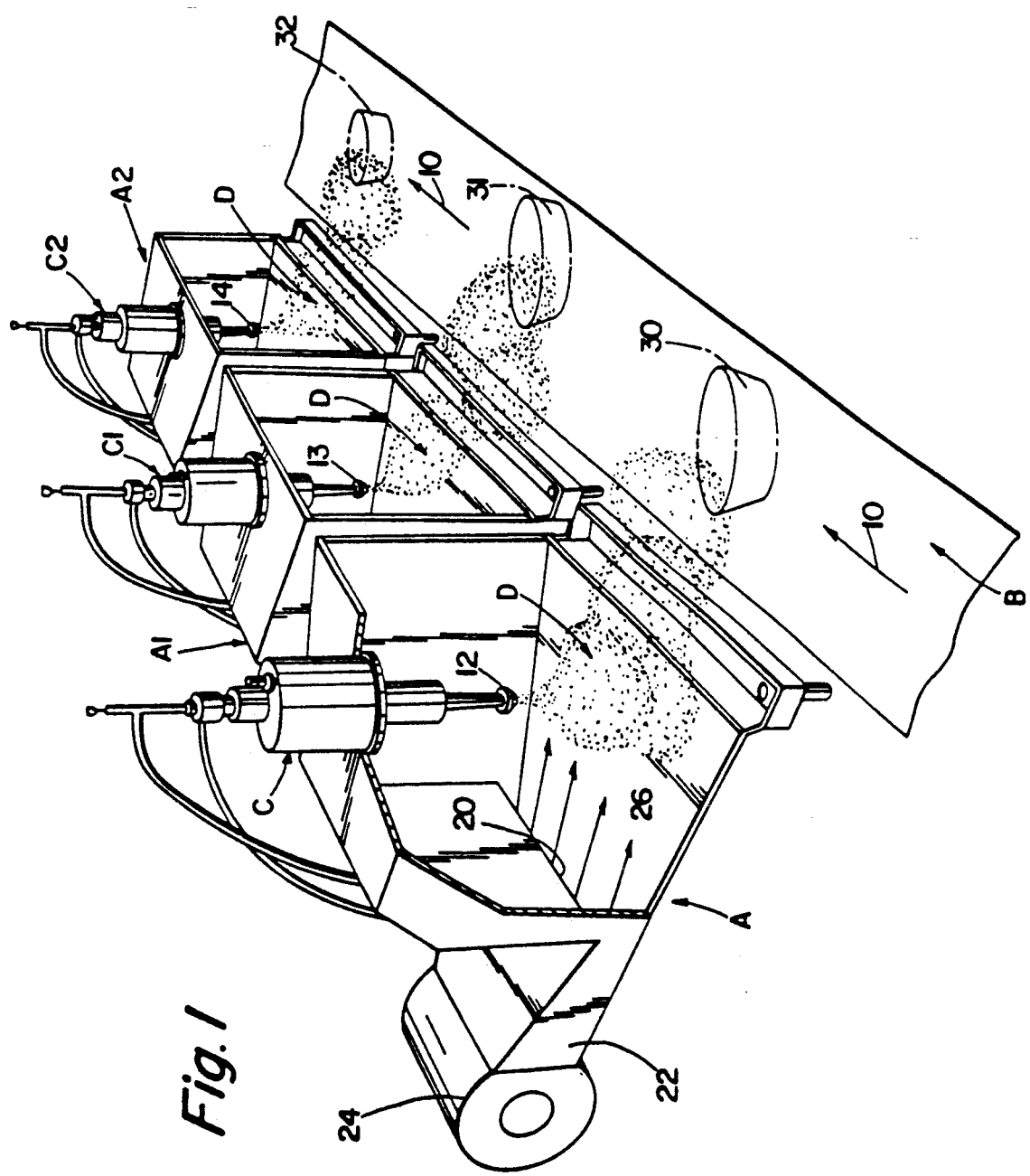
FIG. 1 is a schematic perspective illustration showing cookware being coated with a mist of droplets in accordance with the present application.

Referring now to the drawing, wherein the showings are for purposes of illustrating preferred embodiments of the invention only and not for purposes of limiting same, FIG. 1 shows a battery of hoods A, A1 and A2 having open fronts facing toward a conveyor B traveling in the direction of arrows 10. The open fronts of the hoods are closely adjacent to the conveyor and slightly above same.

An ultrasonic atomizer C, C1 and C2 is centrally mounted to the top of each hood. Each ultrasonic atomizer has a nozzle 12, 13 and 14 positioned inside of its respective hood.

The bottom portion of the rear wall of each hood has an opening therein communicating with a duct. Such an opening is generally indicated at 20 only for hood A and communicates with a duct 22 connected with a high volume, low velocity, air blower 24. Air supplied through duct 22 and opening 20 by blower 24 enters hood A as generally indicated by arrows 26 to gently move a mist of droplets D through the open front of each hood and over conveyor B. Cookware articles 30, 31 and 32 moving past the hoods on conveyor B travel through the mist D and become completely coated with a solution of the droplets that form the mist. The articles of cookware engage the droplets in the mist, and the droplets settle by gravity onto the cookware articles. The droplets merge with one another on the hydrophilic surface to completely coat the same.

The cookware articles 30, 32 are at a temperature between 100°-200° C. when they pass through the mist D for evaporating water in the coating within 30-180 seconds.

Figure 2:
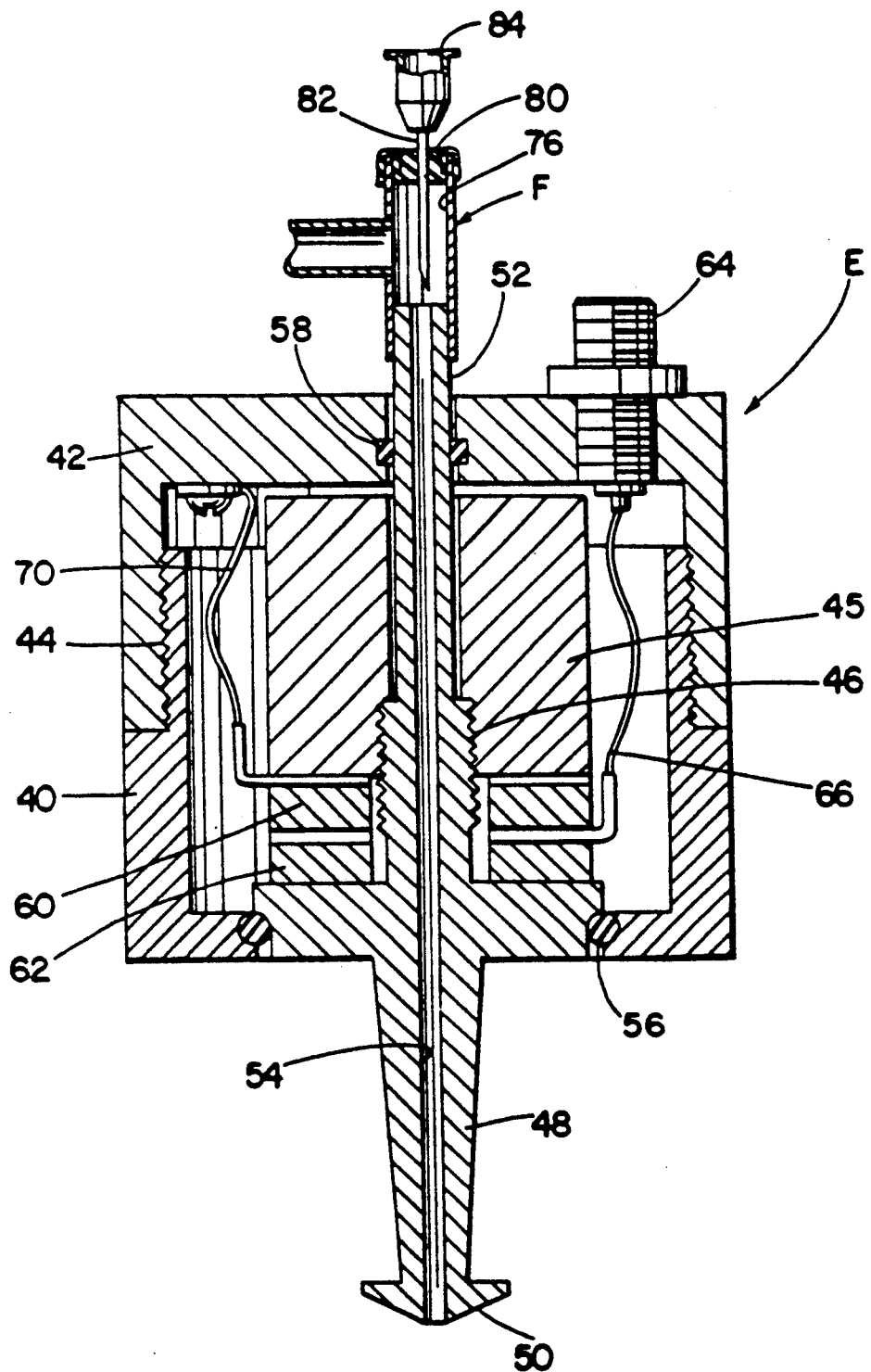
FIG. 2 is a cross-sectional elevational view of an ultrasonic atomizer used to mix and atomize coating solutions in accordance with the present application.

FIG. 2 shows an ultrasonic atomizer E that may be used to mix and atomize a coating solution in accordance with the present application. The ultrasonic atomizer may be the type marketed by Sono-Tek Corporation operating at a frequency of 48 KHz. Examples of such ultrasonic atomizers may be found in U.S. Pat. Nos. 4,153,201, 4,337,896 and 4,655,393, the disclosures of which are hereby incorporated herein by reference.

Ultrasonic atomizer E includes front and rear housing parts 40, 42 threadably connected together as generally indicated at 44. A rear horn 45 is threadably connected at 46 to a front horn 48 having an atomizing surface 50. A liquid feed tube 52 has a passage 54 therethrough that opens outwardly at atomizing surface 50. Suitable O-rings 56, 58 are provided between front horn 48 and front housing part 40, and between liquid feed tube 52 and rear housing part 42. Piezo electric crystals 60, 62 are interposed between front and rear horns 48, 44. An electrical connector 64 is provided on rear housing part 42, and has an input electrode 66 connected with piezo electric crystals 60, 62. A ground electrode 70 leads from piezo electric crystal 60 to rear housing part 42.

A T-shaped fitting F is attached to liquid feed tube 52, and includes a lateral inlet 74 and an upwardly facing inlet 76. The upwardly facing inlet is provided with a cap 78 and an elastomeric seal 80 through which a hypodermic needle 82 extends. A funnel 84 attached to needle 82 communicates with the hollow interior thereof. A 22 gauge hypodermic needle has been used with good results. However, it will be recognized that the gauge of the hypodermic needle depends upon the desired flow rate and the particular application.

In accordance with the present application, deionized water is metered through inlet 74 while film forming molecules are metered through hypodermic needle 82. The two materials pass through passage 54 where they are thoroughly mixed and emulsified before exiting onto atomizing surface 50 for atomization into tiny droplets. In a preferred arrangement, at least 90% of the droplets have a diameter less than about 100 microns.

Amphiphiles that can be used to form film in accordance with the present application include, but are not necessarily limited to alkylalkoxysilanes. In a preferred arrangement, film forming material consists essentially of RmSiXn wherein the non-polar R is an alkyl, alkyl ether or fluoro-alkyl or alkyl ether group of 8 to 30 carbons, X is hydroxy or alkoxy groups, and M plus N equals 4. In the most preferred arrangement, N equals 3 and M equals 1. The film forming substance can be a mixture wherein R has different values. For example, a substance wherein R is 12 carbons has good thermal stability. It is also possible to use a blended mixture of substances such as one having 30 percent with R being 10, 50% where R is 12 and 20% where R is 14.

The film forming substance can be delivered to the ultrasonic atomizer as a pure liquid or as a solution in a solvent. Water miscible solvents such as alcohols are preferred. However, water immiscible solvents could be used. As a pure material, the flow rate of film forming substance has been adjusted to between about 0.1-1 milliliter per minute. When delivered as a solvent solution at a concentration of about 10% film forming substance, the flow rate has been adjusted to between 1-5 milliliters per minute. The film forming substance is delivered by a precision pumping device such as a gear pump or a syringe pump.

Deionized water having a resistance greater than 50,000 ohms per centimeter has been used as the bulk carrier for the coating solution. The water has been fed to the ultrasonic atomizer at a rate of between 50-100 milliliters per minute by gravity feed or by a precision pump.

At the point of delivery to the ultrasonic atomizer, the film forming substance and bulk carrier form a solution of essentially 0.1-1.0% by volume film forming amphiphilic molecules, 1-10% by volume solvent, either miscible or immiscible in water, 0.01-1% by volume catalyst, with the remainder deionized water.

A number of examples will be given as follows:

EXAMPLE 1

In the preferred arrangement, the film forming material used was a mixture $CF_3(CF_2)_nCH_2CH$-$Si(OCH_2CH_3)_3$, where n=5 to 15. The most preferred material was a mixture of about 10% where n is 11, about 40-50% where n is 7 and about 40-50% where n is 9. This was delivered to the atomizer as a 10% volume-by-volume solution in 2-propanol. The flow rate of the film forming material was between 1 to 3 ml/min. The flow rate of the deionized water was set between 50-100 ml/min. Cookware made of borosiliate and sodalime alone was coated. The temperature of the cookware was between about 100°-200° C. Good coverage of the cookware was obtained with 5 to 40 sec exposure to the film forming mist with a single misting device. The water immediately evaporated from the surface of the cookware. The coated cookware surface is indistinguishable from the uncoated surface with the naked eye. The complete curing of the film was achieved either by heating the cookware to 260° C. for 10 to 30 minutes or by a room temperature curing for 2 to 6 weeks.

EXAMPLE 2

This is similar to example 1 except for the use of a catalyst to accelerate the rate of curing of the film forming material. Here the deionized water contained 0.01% to 1% volume-by-volume of concentrated (30%HCl) hydrochloric acid. With the use of the acid catalyst, the time required for complete curing at room temperature was reduced.

EXAMPLE 3

Similar to example 2 except the film forming material used was the octadecyltriethoxysilane $[CH_3(CH_2)_{16}CH_2\text{-}Si(OCH_2CH_3)_3]$. As a pure liquid, the flow rate of this material was adjusted to 0.1 to 0.5 ml/min. When delivered as a 10% volume-by-volume solution in alcohol, the rate was adjusted to 1 to 5 ml/min. The deionized water flow was set between 50-100 ml/min. With this material, complete curing was achieved with in 6 weeks at room temperature. Coating was done using acid catalyst as in example 2.

EXAMPLE 4

Similar to example 2 but the material used was where n=7 in example 1.

EXAMPLE 5

Similar to example 2 but the material used was where n=9 in example 1.

EXAMPLE 6

Similar conditions as in example 2 but material was $CF_3\text{—}(CF_2)_n\text{—}(CH_2)_m\text{—}O\text{—}CH_2\text{—}CH_2\text{—}CH_2\text{—}Si(OC_2H_5)_3$, where n=5-9, m=5-11.

EXAMPLE 7

Similar conditions as in example 2 but the material was $CH_3\text{—}(CH_2)_n\text{—}O\text{—}(CH_2)_3\text{-}Si(OC_2H_5)_3$, n=5-15.

Several tests were performed to judge the properties of the film achieved by this invention.

ABRASION TEST

A coated piece of cookware was subjected to several cycles of abrasion in a Gardner Abrasion Tester (AG 8100). As well as by hand scrubbing, Du Pont's Dobbie Pad, a commercial scrubbing pad for safe cleaning of glass cookware, was used as the abrasion medium. The degradation of the film was judged by contact angle measurements. Cookware coated by all the examples above showed minimal change in the water contact angle from the initial 100°(±5°) reading even after 2000 cycles.

THERMAL TEST

Coated cookware produced by this invention were subjected to thermal tests either at 210° C. or 260° C. in an oven. The dishes were removed periodically and the contact angle was measured. Dishes coated by examples 1, 2, 4 and 5 showed very little change in water contact angle after 16 to 20 hrs at 260° C. At 210° C., several days of heating was required to achieve any degradation. With the dishes coated by Example 3, 6 and 7 the release properties were lost within an hour at 260° C. At 210° C. the coating produced by example 3 has a half life of about 8-10 hrs.

DISHWASHER DURABILITY TEST

Coated cookwares were subjected to dishwasher cycles in a commercial household dishwasher. Various commercially available dishwashing detergents were used. The quality of the film was monitored by periodically checking the contact angle.

Completely cured coatings produced by above examples show good durability in the dishwasher test. They do not show any substantial change in contact angle or release properties even after 50 dishwasher cycles.

COOKING TEST

The coated cookware were subjected to a 25 cycles cooking test. The cycle consisted of cooking an alternating cycle of food rich in fats (macaroni and cheese), acidic food (macaron and tomato sauce) and food rich in starch and sugar (cake). The coating performance was judged by the ease with which the food released and by the ease of cleaning of residue stuck to the cookware. In general, cookware coated by all the examples show good food release properties. It was very easy to clean burnt and baked residues when compared to non-coated cookware. The dishes coated by example 3 show some degradation towards the end of 25 cycles.

Figure 3:
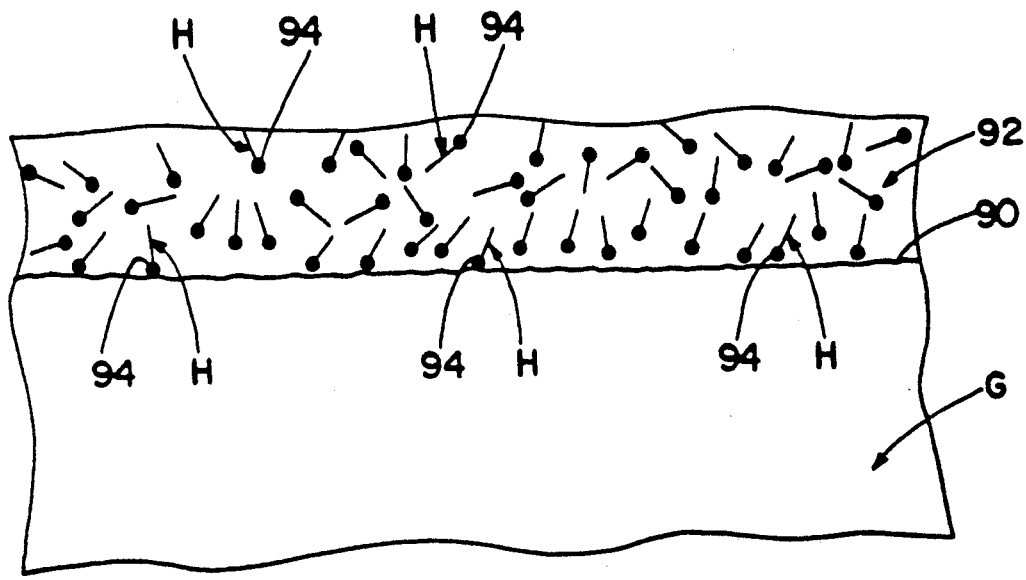
FIG. 3 is a partial side elevational view showing a substrate surface having a coating solution thereon, and with amphiphilic molecules beginning to attach themselves to the substrate surface.

FIG. 3 shows a substrate G having a hydrophilic surface 90 completely covered by a coating 92 of water and amphiphilic molecules in accordance with the present application. Amphiphilic molecules H have polar ends 94 that are attracted to surface 90. Only a few of the molecules are shown attaching themselves to surface 90. Ultimately, the polar ends 94 of molecules H chemically bond to hydroxy groups on surface 90.

Figure 4:
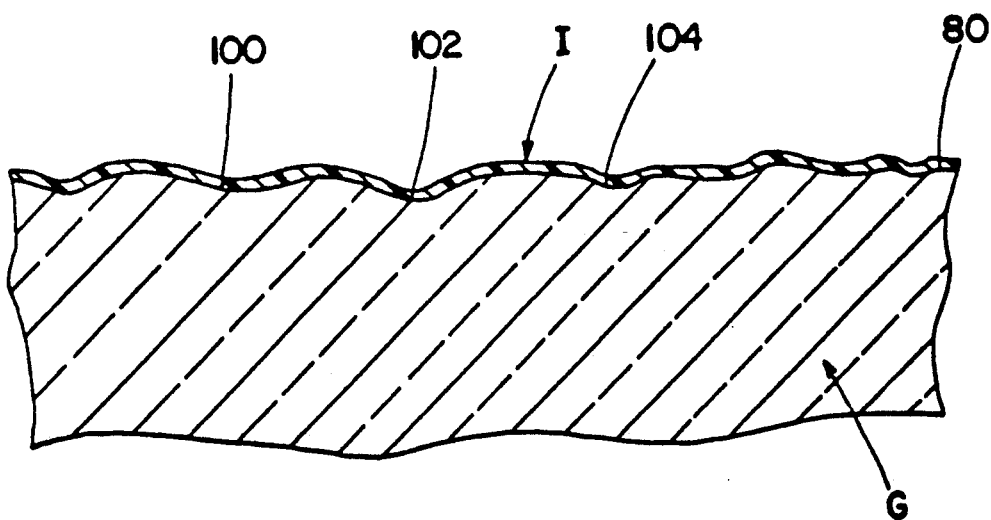
FIG. 4 is a partial cross-sectional elevational view of a substrate surface having an ultra thin film thereon after evaporation of the water from the coating of FIG. 3.

After sufficient molecules have attached to surface 90 to form a substantially continuous film and the water has evaporated, the surface appears as generally indicated in FIG. 4. A substantially continuous film I consisting essentially of amphiphilic molecules applied in accordance with the present application is chemically bonded to surface 90. The substrate surface may have some depressions and other irregularities as generally indicated by numerals 100, 102 and 104. It is believed that film I of the present application follows the contours of such irregularities as shown in FIG. 4 so that the film is of substantially uniform thickness throughout its entire extent. That is, the film is not self-leveling, and is in contrast to films for coatings that are self-leveling and completely fill irregularities in a surface so that the coating or film has many areas of different thickness. However, it is possible that some areas of the substrate surface, particularly microscopic pits or fissures, may be filled with the molecules so that a greater thickness would exist. Film I seals the pores of the surface to which it is attached.

Although the invention has been shown and described with respect to certain preferred arrangements, it is obvious that equivalent alterations and modifications will occur to others skilled in the art upon the reading and understanding of this specification. The present invention includes all such equivalent alterations and modifications, and is limited only by the scope of the claims.

We claim:

1. A solution consisting essentially of 0.1–1.0% by volume film forming amphiphilic molecules, 1–10% by volume solvent miscible in water, 0.01–1% by volume catalyst, and the remainder deionized water.

2. The solution of claim 1 wherein said solution is in the form of droplets at least 90% of which have a diameter not greater than 100 microns.

3. A solution consisting essentially of 0.1–1.0% by volume film forming amphiphilic molecules, 1–10% by volume solvent immiscible in water, 0.01–1% by volume catalyst, and the remainder deionized water.

4. The solution of claim 1 wherein said molecules are polymerizable.

5. The solution of claim 3 wherein said molecules are polymerizable.

6. A mist of droplets formed from a solution consisting essentially of 0.1–1.0% by volume film forming amphiphilic molecules, 1–10% by volume solvent that is miscible or immiscible in water, 0.01–1% by volume catalyst, and the remainder deionized water.

7. The mist of claim 6 wherein said molecules are polymerizable.

* * * * *